(12) United States Patent
Delgado et al.

(10) Patent No.: US 10,948,094 B2
(45) Date of Patent: Mar. 16, 2021

(54) AUTOMATIC ON OFF FIRE SPRINKLER

(71) Applicants: Raul Adonis Delgado, Jefferson City, MO (US); Brian Charles Delgado, Fayetteville, NC (US)

(72) Inventors: Raul Adonis Delgado, Jefferson City, MO (US); Brian Charles Delgado, Fayetteville, NC (US)

(*) Notice: Subject to any disclaimer, the term of this patent is extended or adjusted under 35 U.S.C. 154(b) by 137 days.

(21) Appl. No.: 16/114,355

(22) Filed: Aug. 28, 2018

(65) Prior Publication Data

US 2019/0063628 A1    Feb. 28, 2019

Related U.S. Application Data

(60) Provisional application No. 62/605,767, filed on Aug. 28, 2017.

(51) Int. Cl.
| | |
|---|---|
| *F16K 17/38* | (2006.01) |
| *A62C 37/08* | (2006.01) |
| *F16K 1/00* | (2006.01) |
| *A62C 37/11* | (2006.01) |
| *F16K 31/00* | (2006.01) |
| *F16K 31/36* | (2006.01) |

(52) U.S. Cl.
CPC .............. *F16K 17/38* (2013.01); *A62C 37/08* (2013.01); *A62C 37/11* (2013.01); *F16K 1/00* (2013.01); *F16K 31/002* (2013.01); *F16K 31/36* (2013.01)

(58) Field of Classification Search
CPC .......... F16K 17/38; F16K 1/00; F16K 31/002; F16K 31/36; A62C 37/08; A62C 37/11
USPC .............................. 239/75; 169/19, 20, 37, 90
See application file for complete search history.

(56) References Cited

U.S. PATENT DOCUMENTS

| | | | | |
|---|---|---|---|---|
| 4,258,795 | A * | 3/1981 | Hansen | ................... A62C 37/08 137/79 |
| 9,534,701 | B2 * | 1/2017 | Gano | ...................... E21B 34/06 |

\* cited by examiner

*Primary Examiner* — Christopher S Kim
(74) *Attorney, Agent, or Firm* — Scully, Scott, Murphy & Presser, P.C.

(57) ABSTRACT

A fire sprinkler including: a body connected to a water supply and having a passage, the passage having a sealing material or a sealing surface at a first end; an actuator disposed in the passage, the actuator and passage configuring a water-tight seal; a water spreader configured to direct water radially outward; and a wax motor actuated by an ambient temperature greater than a predetermined threshold temperature such that actuation of the wax motor exerts an actuation force on the second end of the actuator to move the actuator to a seal between the water supply and the water spreader; wherein the actuator is arranged such that the pressure from the water supply tends to move the actuator to stop water flow when the ambient temperature falls below the predetermined threshold temperature.

6 Claims, 4 Drawing Sheets

AUTOMATIC ON OFF FIRE SPRINKLER

CROSS REFERENCE TO RELATED APPLICATION

This application claims benefit U.S. Provisional Application No. 62/605,767, filed on Aug. 28, 2017, the entire contents of which is incorporated herein by reference.

BACKGROUND

1. Field

The present invention relates generally to fire sprinklers, and more particularly, to an automatic fire sprinkler using a wax motor actuator valve. Wax motors are also known as thermal valves or thermal actuators. The use of "wax motor" herein includes thermal valves and thermal actuators that are actuated by any material exhibiting similar phase change behaviors as wax.

2. Prior Art

Sprinkler valves are known in the art to have wax motor actuators. A wax motor is a linear actuator device that converts thermal energy into mechanical energy by exploiting the phase-change behavior of waxes and other inorganic materials, some of which may include wax. During melting, wax typically expands in volume by 5% to 20% (Freund et al. 1982).

A wide range of waxes can be used in wax motors, ranging from highly refined hydrocarbons to waxes extracted from vegetable matter. Specific examples include paraffin waxes in the straight-chain n-alkanes series. These melt and solidify over a well-defined and narrow temperature range. Depending on particular formulation of the wax employed in the wax motor, expansion rates of the waxes can be as little as 1% to as much as 25% in a temperature range anywhere between 30° F. to 300° F. (−1.11° C. to 148.88° C.)

Conventional fire sprinklers of the type employing wax motors typically configure the wax motor orthogonally with respect to the flow of water through the sprinkler head to avoid such water from cooling the wax motor after it has been actuated, and consequently, unintentionally closing the valve when water sprinkling may be necessary. Such configurations generally result in the need for complicated and expensive designs, such as return springs and mechanical linkages for transmitting the wax motor actuation to an actuation of the sprinkler head/valve.

SUMMARY

Therefore it is an object to provide a sprinkler head employing a wax motor which avoids the complication and resulting expense associated with prior art sprinkler heads employing wax motors.

Accordingly, a fire sprinkler is provided, the fire sprinkler comprising: a body having a first end for connection to a water supply, the water supply exerting a pressure on the first end, the body having passage extending from the first end to a second end, the passage having one of a sealing material or a sealing surface at the first end of the body; an actuator disposed in the passage, the actuator having a first end corresponding to the first end of the body, the first end of the actuator having an other of the sealing material or the sealing surface, the first end of the passage and the first end of the actuator configuring a water-tight seal; a water spreader in fluid communication with the second end of the passage, the water spreader being configured to direct water radially outward from the body; and a wax motor operatively connected to the second end of the actuator, the wax motor being actuated by an ambient temperature greater than a predetermined threshold temperature such that actuation of the wax motor, at least indirectly, exerts an actuation force on the second end of the actuator to move the actuator in a first direction to unseal the first end of the actuator from the first end of the passage and open fluid communication between the water supply and the water spreader; wherein the actuator is arranged such that the pressure from the water supply tends to move the actuator in a second direction opposite to the first direction to seal the first end of the actuator and the first end of the passage when the ambient temperature falls below the predetermined threshold temperature.

An outside surface of the first end of the body can have a threaded connection to the water supply.

The first end of the passage can include the sealing surface and the first end of the actuator can include the sealing material, the sealing material being formed of an elastomer.

The wax motor can include a surface welded to a corresponding surface of the water spreader.

The actuator can have a length such that the second end is disposed within a bore formed in the wax motor.

The body can include a first portion having the first end of the body and a second portion having an open area to an outside of the body between the first portion and the second end of the body. The second portion can include a plurality of rods connected between the first portion and the water spreader.

The fire sprinkler can further comprise a shroud for directing water flow away from the wax motor after activation of the wax motor.

The actuator and the wax motor can be arranged along a longitudinal axis of the body.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION

Figure 1:
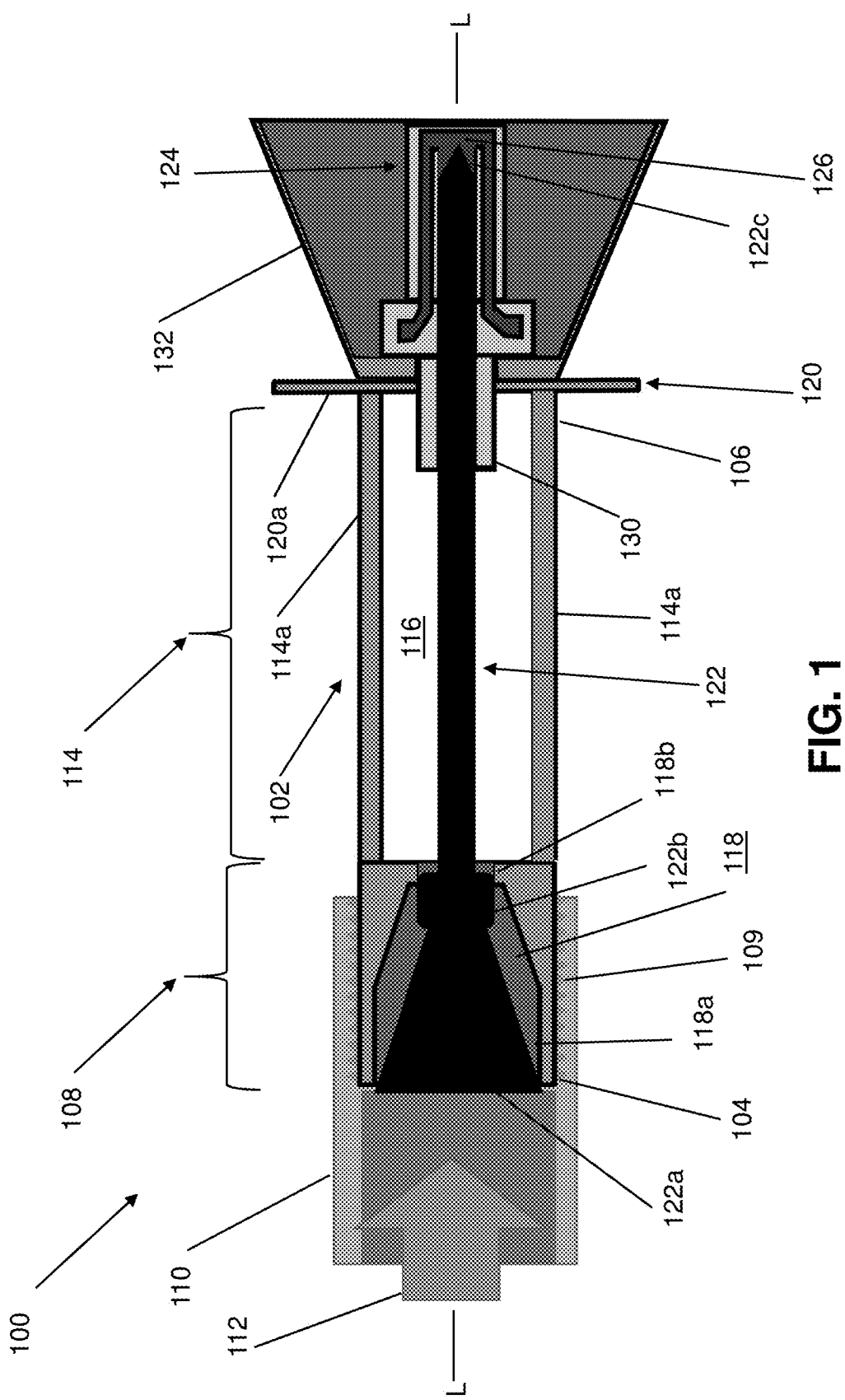
FIG. 1 illustrates a sectional view of an embodiment of a fire sprinkler employing a wax motor for actuation thereof.
Figure 2:
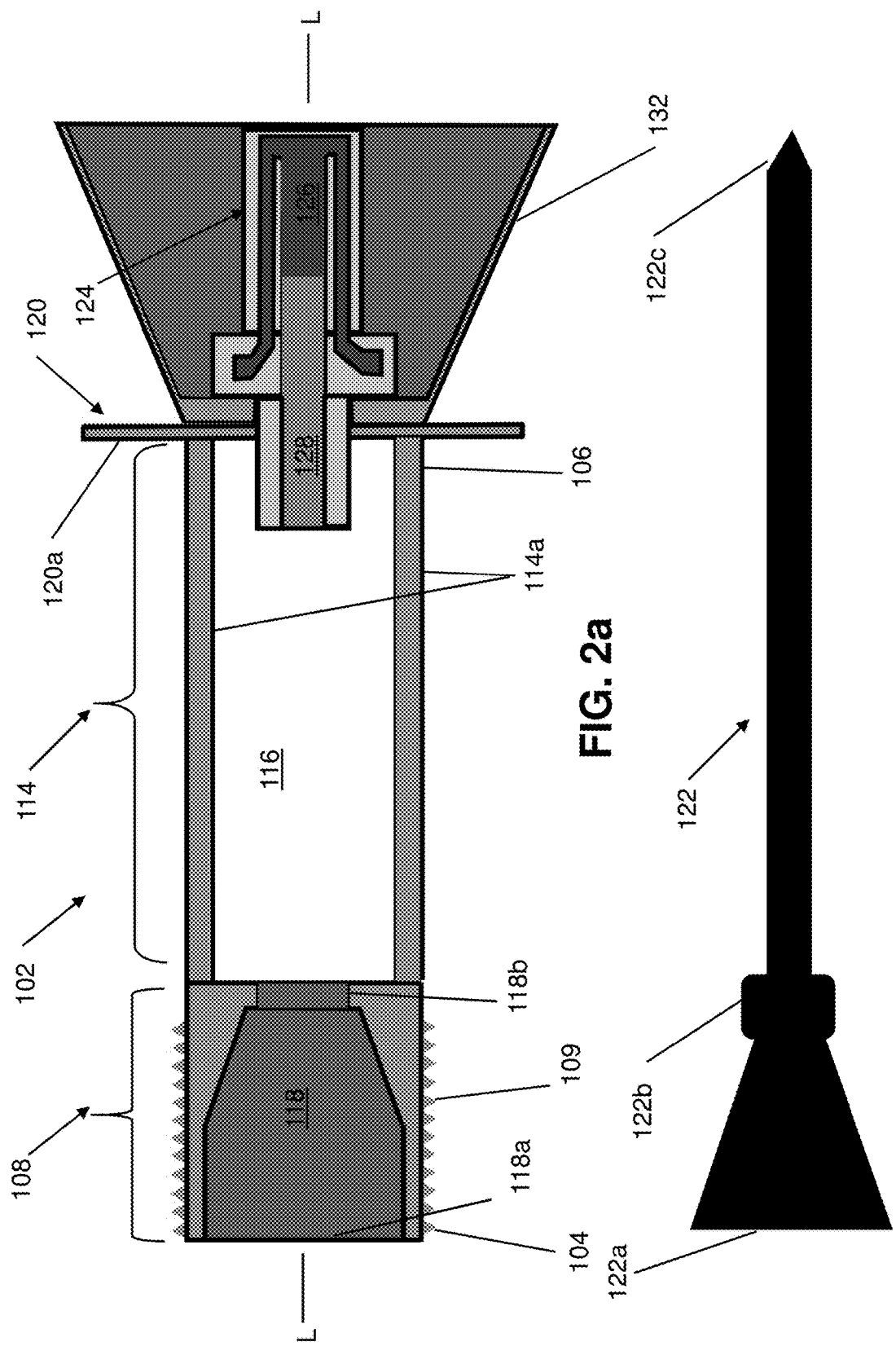
FIG. 2a illustrates a sectional view of the fire sprinkler of FIG. 1 without the actuator and without the water supply.
FIG. 2b illustrates a sectional view of the actuator of FIG. 1.

Referring now to FIGS. 1, 2a and 2b, an embodiment of a fire sprinkler is illustrated, the fire sprinkler being referred to generally by reference numeral 100. The fire sprinkler having a body 102 formed of a strong material, such as metal. The body 102 having a first end 104 and a second end 106. A first portion 108 is disposed at the first end 104 and includes an external connection 109 to a water supply 110 at the first portion 108 of the body. The water supply 110 supplying water that exerts a pressure 112 on the first end.

The connection 109 of the water supply to the first end 104 of the body 102 can be any type know in the art, such as a standard plumbing thread.

The body 102 further having a second portion 114 providing a second passage 116 extending from the first end 104 to the second end 106. The second passage 116 communicating with a first passage 118 in the first portion 108. The first and second passages being generally referred to as a "passage" for providing fluid communication from the water supply 110 to the water spreader 120, discussed below. The second portion 114 can be formed of a plurality of rods 114a disposed around a periphery of the second portion 114. Although the first and second portions can be provided in cylindrical shapes, any other shape is possible. Open spaces between the plurality of rods providing one or more openings to permit water flowing toward the water spreader 120 to impact and flow radially outward from the water spreader 120. Furthermore, any other opening configuration in the second portion 114 is possible, such as a mesh or other configuration having a plurality of spaced openings, which can be regularly spaced or have some other predetermined pattern. The openings can also be provided only at the second end 106 by axially directed openings in a cylindrical wall of the second portion 114. Although shown as separable, the first and second portions 108, 114 can be integrally formed as a single piece.

The first passage 118 has an inlet 118a for water from the water supply 110. The first passage 118 having one of a sealing material or a sealing surface. In the embodiment of FIG. 1, the first passage 118 has a necked down portion 118b acting as a sealing surface.

The fire sprinkler 100 further includes an actuator 122 movably disposed in the passage 118, 116. The movement of the actuator 122 being generally in translation. As discussed below, a movement to the left in FIG. 1 is referred to an as actuated position and a movement to the right is referred to as an un-actuated or sealed position. The actuator 122 can be formed of a strong material, such as metal. However, the actuator can be formed of strong plastics, such as those reinforced with fibers. The actuator 122 having a first end 122a corresponding to the first end 104 of the body 102. The first end 122a of the actuator 122 having an other of the sealing material or the sealing surface. In the configuration shown in FIGS. 1, 2a and 2b, the first end 122a of the actuator 122 includes a sealing material 122b, which can be any sealing material known in the art, such as an elastomer, plastic, cork or the like. The sealing surface 118b at the first portion 108 of the body 102 and the sealing material 122b at the first end of the actuator 122 configuring a water-tight seal as shown in FIG. 1, which prevents a water flow from the first portion 108 to the second portion 114 of the body 102. Those skilled in the art will appreciate that the sealing material can be provided on the first portion of the body and the sealing surface on the actuator. Although schematically shown integrally formed with actuator 122, the sealing material 122b can be provided separably therefrom, such as an o-ring fitted into a corresponding o-ring groove formed in the actuator, as is known in the art or the sealing material 122b can be insert injection molded or otherwise fixed to a surface of the actuator 122.

As discussed above, the fire sprinkler 100 includes a water spreader 120 in fluid communication with the passage 118, 116 at least at the second end 106 of the body 102. The water spreader 120 is shown schematically in FIGS. 1 and 2a since the configuration thereof is well known in the art and which generally includes a surface 120a that directs water radially outward from the body 102. Typical water spreaders 120 for use on fire sprinklers have a plurality of radial grooves for evenly distributing the water radially outward or a predetermined pattern of such radial grooves for distributing the water in some predetermined pattern.

The fire sprinkler 100 of FIGS. 1, 2a and 2b also includes a wax motor 124 that operates as a thermal actuator/thermal valve that is operatively connected to a second end 122c of the actuator 122. The configuration and operation of wax motors 124 are well known in the art and a detailed description thereof is omitted herein. Basically, the wax motor 124 includes a material 126 (which can be any number of known materials, including wax) that exhibit a change in volume upon being heated and which return to a decreased volume upon cooling. Although discussed in terms of such material being wax or some form of inorganic material having wax, "wax motor" as using herein includes any actuator having a material exhibiting a similar actuation as a wax motor.

The wax motor 124 can be provided with an opening 128 for accepting the second end 122c of the actuator 122. A bushing 130 can be provided for guiding the second end 122c of the actuator 122 into the opening 128 of the wax motor 124. The opening 128 is surrounded by the wax 126 (or other thermally acceptable material) and exerts a force 113 on the second end 122c when the wax is heated. The second end 122c can be shaped or otherwise configured to maximize the force 113. Alternatively, as known in the art, the wax motor 124 can have a sealed housing with a rod extending therefrom where the rod is actuated by the material 126 being heated. The rod can be operatively connected to the second end 122c of the actuator 122, such as merely being in contact with each other or through a mechanical coupling to exert the force on the second end 122c. The wax motor 124 can be protected from water flow that may act to inadvertently cool the same, such as by a shroud 132.

The actuator 122 and the wax motor 124 can be arranged along a longitudinal axis "L" of the body 102 to avoid the complicated linkages and other mechanisms used in prior art fire sprinklers.

FIG. 2a shows the fire sprinkler 100 without the actuator 122 and without connection to the water supply 110 while FIG. 2b shows the actuator outside of the fire sprinkler 100 to show features that may be hidden or not apparent in the assembly of FIG. 1.

Figure 3:
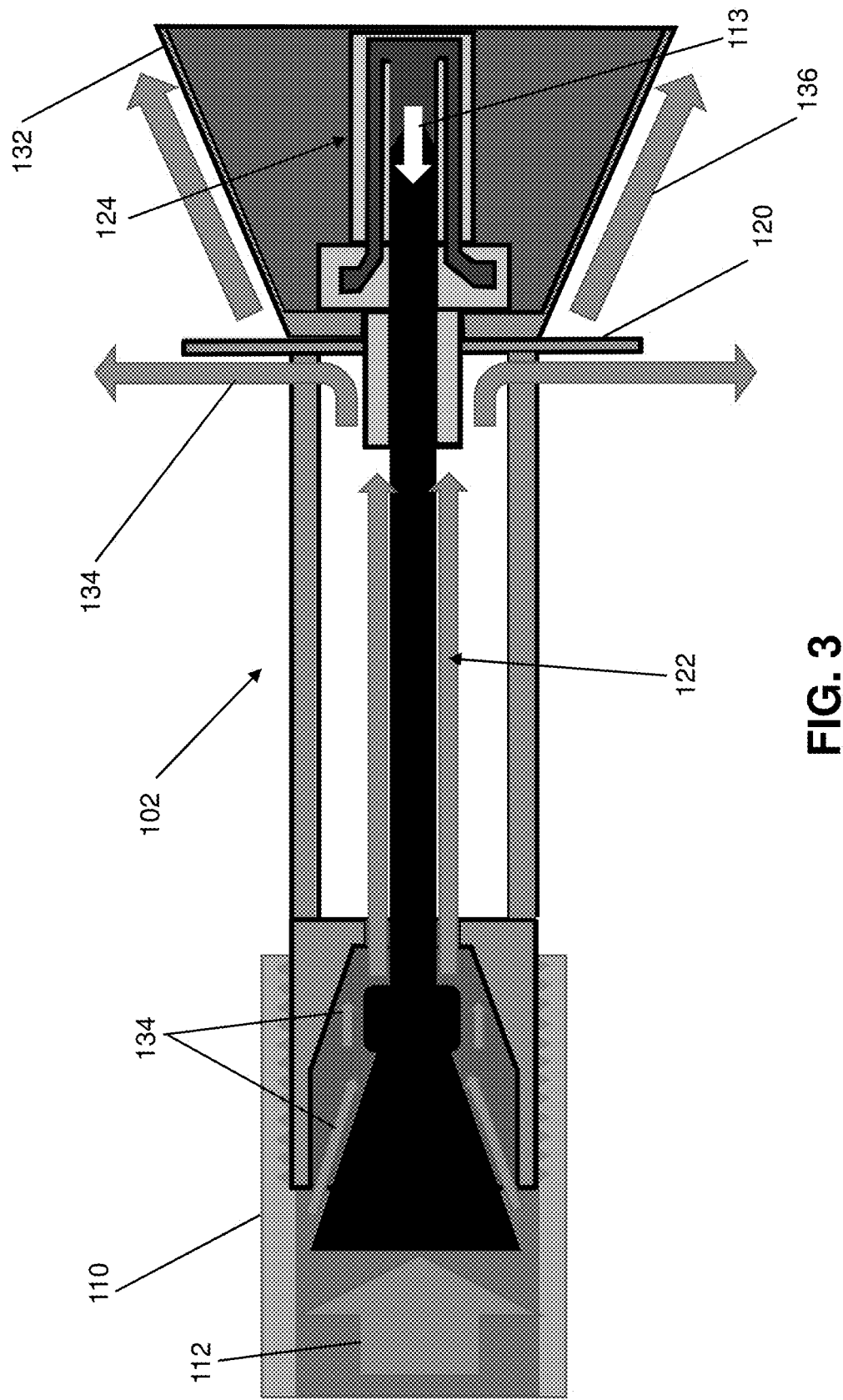
FIG. 3 illustrates a sectional view of the fire sprinkler of FIG. 1 in an actuated configuration.

Referring now to FIG. 3, the fire sprinkler 100 of FIG. 1 is shown in an actuated configuration where the wax motor 124 is actuated by an ambient temperature greater than a predetermined threshold temperature. Such heat is, for example, caused by a fire in an area in which the fire sprinkler 100 is located. The actuation of the wax motor 124 results in an exertion of a force from an expanding material 126, which is at least indirectly transferred to the second end 122c of the actuator 122, to move the actuator 122 in a first direction (to the left in FIG. 3) to unseal the sealing material 122b at the first end 122b of the actuator 122 from the sealing surface 118b at the first end 104 of the body 103. Such actuation results in opening a fluid communication between the water supply 110 and the water spreader 120 (as shown by arrows 134) in which water is directed radially outward from the body to extinguish a fire in the area in which the fire sprinkler 100 is located. As shown in FIG. 3, unintended water flow 136 that may act to cool the wax motor 124 can be directed away from the wax motor 124 by the shroud 132 or other means known in the art.

Figure 4:
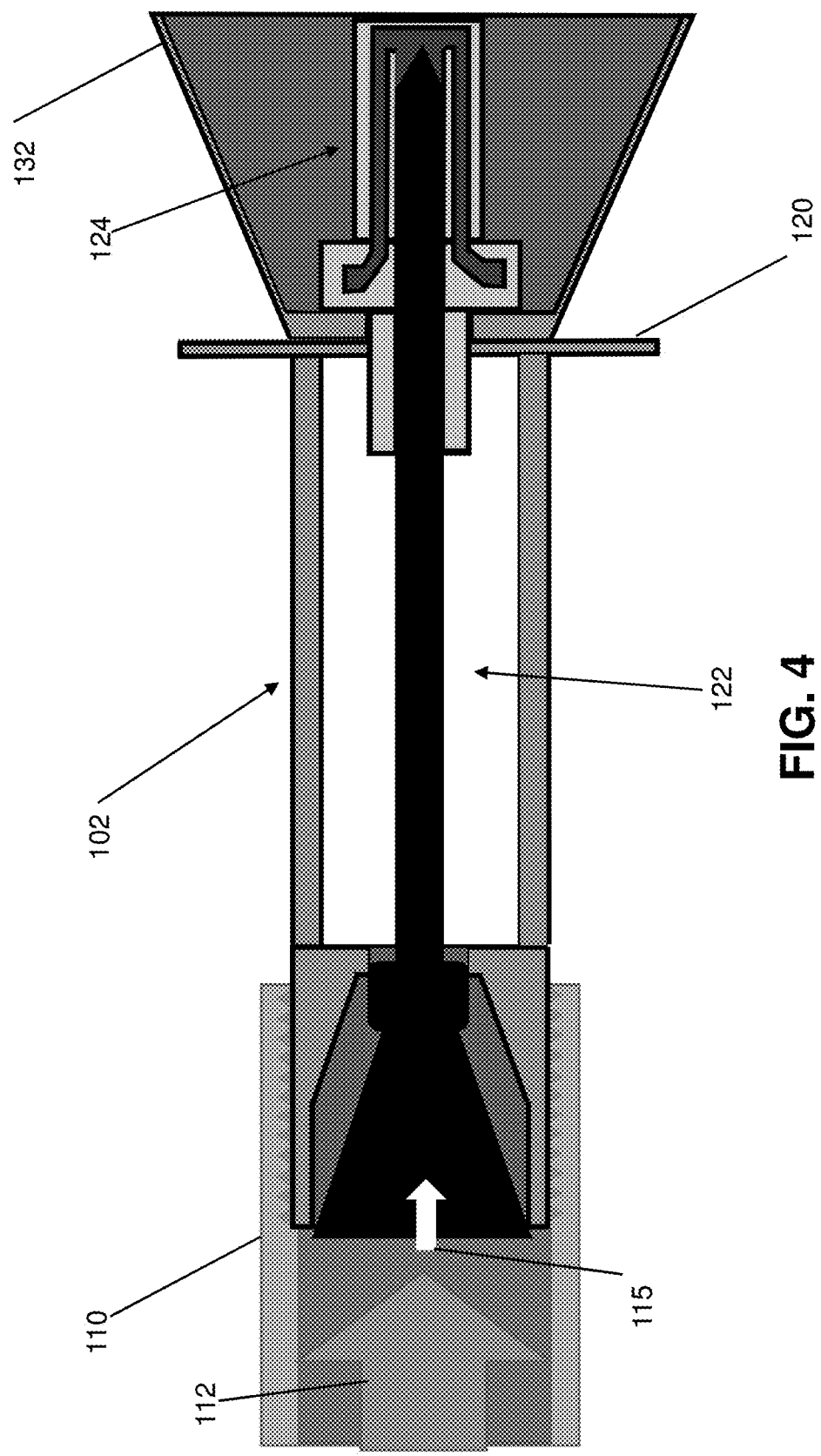
FIG. 4 illustrates a sectional view of the fire sprinkler of FIG. 1 returning to a sealed (un-actuated) configuration.

As shown in FIG. 4, when the ambient temperature falls, the material 126 cools and its volume decreases such that the force is no longer exerted on the second end 122c of the actuator 122 (or exerted to a lesser extent such the actuator seals). As a result, the actuator 122 can be returned to a sealed position shown in FIG. 4. Unlike prior art fire sprinklers, which require mechanisms and springs to return the actuator to the sealed position, the actuator 122 of the fire sprinkler 100 is arranged such that the pressure 112 from the water supply 110 exerts a return force 115 on the first end 122*a* of the actuator 122 which tends to move the actuator in a second direction (to the right in FIG. 4) opposite to the first direction to seal the first end of the actuator 122 and the first end of the passage 118*a* when the ambient temperature falls below some predetermined threshold temperature. The first end 122*a* of the actuator 122 can include a widened portion having a large cross sectional area so that the return force from the pressure of the water supply 110 can be maximized.

Those skilled in the art will appreciate that the force exerted by the wax motor 124 on the second end 122*c* of the actuator must be larger than the force of the water supply acting on the first end 122*a* of the actuator 122 so that the wax motor 124 can operate to actuate the actuator 122 by overcoming the force of the water supply acting on the first end 122*a* of the actuator 122. The selection of proper material 126, sizes of the first end 122*a* and second end 122*c* of the actuator for given operating parameters (such as water pressure and predetermined temperature at which the fire sprinkler is to be activated) are within the level of skill of those in the art.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A fire sprinkler comprising:
    a body having a first end for connection to a water supply, the water supply exerting a pressure on the first end of the body, the body having a passage extending from the first end to a second end, the passage having a first end and a second end corresponding to the first end and the second end of the body, the passage having one of a sealing material or a sealing surface at the first end of the body;
    an actuator disposed in the passage, the actuator having a first end and a second end corresponding to the first end and the second end of the body, the first end of the actuator having an other of the sealing material or the sealing surface, the first end of the passage and the first end of the actuator configuring a water-tight seal;
    a water spreader in fluid communication with the second end of the passage, the water spreader being configured to direct water radially outward from the body; and
    a wax motor operatively connected to the second end of the actuator, the wax motor comprising a wax material being actuated by an ambient temperature greater than a predetermined threshold temperature such that actuation of the wax motor, at least indirectly, exerts an actuation force on the second end of the actuator to move the actuator in a first direction to unseal the first end of the actuator from the first end of the passage and open fluid communication between the water supply and the water spreader;
    wherein the second end of the actuator is in engagement with the wax material of the wax motor;
    the actuator is arranged such that the pressure from the water supply tends to move the actuator in a second direction opposite to the first direction to seal the first end of the actuator and the first end of the passage when the ambient temperature falls below the predetermined threshold temperature;
    the actuator and the wax motor are coincidently arranged along a central longitudinal axis of the body such that the actuator and the wax motor are axially aligned; and
    the body includes a first portion having the first end of the body and a second portion having an open area to an outside of the body between the first portion and the second end of the body.

2. The fire sprinkler of claim 1, wherein the first end of the passage includes the sealing surface and the first end of the actuator includes the sealing material, the sealing material being formed of an elastomer.

3. The fire sprinkler of claim 1, wherein the wax motor includes a surface welded to a corresponding surface of the water spreader.

4. The fire sprinkler of claim 1, wherein the actuator has a length such that the second end is disposed within a bore formed in the wax motor.

5. The fire sprinkler of claim 1, wherein the second portion includes a plurality of rods connected between the first portion and the water spreader.

6. The fire sprinkler of claim 1, further comprising a shroud for directing water flow away from the wax motor after activation of the wax motor.

* * * * *